March 15, 1955 D. C. GRESHAM 2,704,254

PHOTOGRAPHICALLY SENSITIVE ELEMENT FOR PHOTOMECHANICAL REPRODUCTION

Filed Jan. 24, 1952

Inventor
Donald Charles Gresham

By
Stevens, Davis, Miller & Mosher
his Attorneys 2,704,254
Patented Mar. 15, 1955

2,704,254

PHOTOGRAPHICALLY SENSITIVE ELEMENT FOR PHOTOMECHANICAL REPRODUCTION

Donald Charles Gresham, London, England, assignor to McCorquodale & Company Limited, London, England, a British company Application January 24, 1952, Serial No. 267,989
Claims priority, application Great Britain March 24, 1950
1 Claim. (Cl. 95—8)

Figure 1:
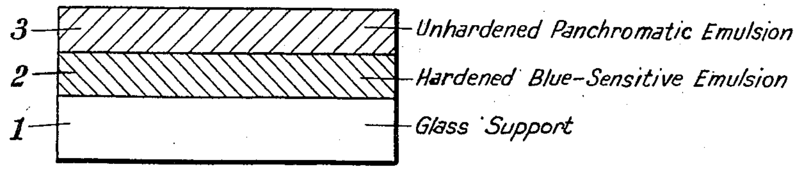

This invention relates to photographic light sensitive materials useful for photo-mechanical reproduction and particularly useful in new methods of making screen records, for correction of tone in such records and for producing colour-corrected screen records.

The application is a continuation-in-part of application No. 211,842 filed February 20, 1951, which describes and claims the said methods.

In the usual photo-litho process a half-tone screen negative is first made of the original, in a process camera, a half-tone screen positive is made from this, usually by contact-printing, and a printing plate is made from the screen positive. Usually a good deal of hand retouching has to be carried out both on the screen negative and on the screen positive, to correct for deficiencies in the process, in order to produce a printed image in which the tone graduation and scale is similar to that of the original.

Attempts have been made to simplify and shorten the procedure by producing a screen positive directly from the original subject by a reversal technique. This consists essentially in exposing a photographic plate behind a half-tone screen in the process camera, to light from the original subject, developing the negative image thus obtained to a silver image, dissolving away the silver, for example in acid potassium dichromate subjecting the plate to uniform exposure to white light (thus rendering developable the silver halide which was unaffected by the original exposure) and developing the newly formed latent image to silver. The image thus obtained is a positive image complementary to the original negative image, which was dissolved away. The process presents two major difficulties, however, in that in the first place it is necessary to give a very full exposure at the first stage in order to ensure that all the silver halide in the image areas is developed and dissolved away since only in this way can clear highlights be obtained in the positive (an essential condition where the plate is to be used for printing on to metal) and in the second place variations in the thickness of the emulsion coating on the plate result in local variations in dot size in the developed positive. The necessity of giving very full exposure at the first stage means that small dots and fine detail on the positive are liable to be lost. For these reasons the reversal technique briefly described above is not generally practised by photomechanical workers except for making positives directly from line image originals. For continuous-tone originals where a fine screen is required the method is quite unsatisfactory.

As indicated above a good deal of hand re-touching is necessary in these processes because the tonal gradation and range of the printed product obtained from the screen positive is not sufficiently close to that of the original subject. The present invention is directed to photographic materials useful in methods of overcoming this difficulty.

According to the present invention a photographic element comprises a transparent support carrying two superimposed photographic gelatino silver halide emulsion layers of which the outer emulsion layer is unhardened and the inner emulsion layer is hardened and incapable of recording an image in a colour to which the outer emulsion layer is sensitive.

The foregoing photographic element may be used in the process described in application No. 211,842 for the production of screen positives which yield in the printed product a tonal gradation which conforms more closely to that of the original subject. The said process comprises exposing a photographic emulsion layer behind a half-tone screen in a process camera to light from an original subject, developing the resulting latest screen negative image to a relatively low gamma value, printing the screen negative image thus obtained on to a second photographic emulsion layer, the image layer and the emulsion layer being separated by at most a thin intervening layer and the printing exposure being partly to uniform light and partly in the camera to light from the original subject, developing the screen positive thus obtained to a relatively high gamma value and separating the screen negative therefrom.

In practice it has been found that the relative intensities of the highlights and shadow of the original subjects are usually such that, if the whole printing-exposure is effected in the camera to the original subject, an overcorrection results. Accordingly in the preferred method, part of the printing-exposure is effected to the original subject, sufficient to effect the desired tonal correction, and the remainder of the printing-exposure is effected to uniform light. The optimum ratio of these exposures depends on the photographic material and the method of plate making employed but is generally found to be of the order of 30:1.

It is necessary to arrange that the front layer of the photographic element should be capable of exposure without affecting the rear layer. Various methods of achieving this result are available. Thus the two layers may be sensitive to different regions of the spectrum, e. g. the front layer may be green or red sensitive and rear layer sensitive only to blue light, the first exposure being made through a yellow filter, affecting only the front layer, and the second exposure being made without a filter so as to affect the rear layer. However, this method is not available where the originals are coloured and a colour-corrected record is required. Alternatively, and this is generally preferred, a thin filter layer is interposed between the two emulsion layers, the colour of the filter being dischargeable during the processing of the front layer image. Preferably the filter layer should be coloured black and should be such that its colour is removed during the developing steps applied to the front image layer. Thus it may be coloured with dyestuffs which are washed out or discharged during development of the silver image.

It is also necessary in this case that the front emulsion layer be removable. This is achieved by arranging that the front emulsion layer is formed in unhardened gelatin, whereas the rear emulsion layer is formed in hardened gelatin. It is thus possible to remove the front emulsion layer merely by washing the photographic element in hot water.

Using this type of photographic element the preferred procedure is as follows: the element is set up in the process camera with the front emulsion layer adjacent a half-tone-screen and the element is exposed through the screen to light reflected from the original subject. The presence of the filter layer prevents the light affecting the rear emulsion layer. The element is then developed to a relatively low gamma value, washed and replaced in the camera in the same position as it originally occupied. During the development the colouration of the filter layer is removed. Sufficient exposure without the screen is then made to the original subject to effect the desired tonal correction and the remainder of the exposure is effected to white light reflected from a white sheet covering the subject. The unexposed areas of the front emulsion are fogged by this exposure so that when the element is re-developed to a high gamma value, the required screen positive image is obtained in the rear layer and the front layer is more or less uniformly blackened with silver. After fixing and washing the element it is washed in warm water to remove the whole of the front emulsion layer leaving behind an element which carries only the required screen positive.

The gamma values to which the emulsion layers are processed will depend to some extent on the particular conditions employed but generally the initial screen negative will be made under such conditions that it has a range of dot sizes greater than could normally be tolerated and its gamma value will be lower than is usual for screen negatives, e. g. between 2 and 3.

The aforesaid processes may be modified to produce colour-separation screen positives of a coloured original and the colour rendering corrected to allow for imperfections in the printing inks to be used. Considered in its simplest form the production of a coloured record by the photo-litho process requires the preparation of the three screen positives corresponding to the usual primary responses of the original, i. e. red, green and plue. Litho plates are made from these and printed respectively in superposition in cyan, magenta and yellow inks. Usually, in order to strengthen the record obtained a black and white record, the so-called "black printer," is also included.

Unfortunately printing inks and especially the available cyan and magenta inks, do not accord with the requirements of these subtractive colours. The cyan inks, which should absorb absolutely in the red and transmit blue and green freely, usually have an undesirably high absorption of green light, to such an extent in fact that such inks are usually called "blue" inks in the trade. The magenta inks, which should absorb absolutely in the green and transmit freely in the red and blue usually have an undeirably high absorption of blue light, to such an extent that these inks are usually referred to as "red" inks in the trade. Accordingly it is always necessary to effect a very considerable amount of retouching on the screen separation positives in order that a satisfactory colour reproduction should be finally obtained.

By using photographic elements according to the present invention, screen separation positives are prepared on panchromatic material by the technique hereinbefore described and imperfections in the printing inks to be used are balanced by effecting a correction of each separation image at the second exposure stage by printing a positive image on the rear emulsion by a second exposure which is varied from point to point over the area of the image in correspondence with variations in the colour response of the original in the waveband of that other of the separation records which is to be printed in an ink which absorbs undesirably in the waveband which the first separation record records.

Generally, in ordinary practice since, as explained above, the red record is to be printed in cyan ink which absorbs undesirably in the green, it is necessary to effect part of the second exposure of the green record to the original through a red filter. In addition since the green record is to be printed in magenta ink which absorbs undesirably in the blue, it is necessary to effect part of the second exposure of the blue record to the original through a green filter. The blue record, or in the other hand, is to be printed in yellow ink, which is usually spectrally satisfactory so that it is usually satisfactory to effect the second exposure of the red record through a red filter.

In carrying out this aspect of the invention the simple procedure is to effect the second exposure of the blue separation screen negative partially to the original subject via a green tri-colour filter, to effect the second exposure of the green separation screen negative partially to the original subject via a red filter and to effect the second exposure of the red separation screen negative partially to the original subject via a red filter. In this last case no colour correction is effected (since none is normally required) but the partial second exposure to the original subject effects the tone correction referred to earlier herein.

It is, of course, necessary in carrying out this process to select carefully the nature of the filter layer employed. A black filter layer is, of course, suitable for making screen positives from all of the separation records since it is an effective screen for all coloured light. Alternatively, however, different photographic elements may be used for the production of screen positives from the different separation records. For example, an element with a dischargeable blue filter layer is suitable for making a screen positive from the red separation record, an element wtih a dischargeable red filter layer is suitable for making a screen positive from the blue separation record and either of these materials is suitable for making a screen positive from the green separation record.

The elements of this invention may also be adapted for use with the half-tone block and bi-metal litho processes. In the half-tone block process, as normally carried out, a screen negative is made from the original in a process camera and this is used for making the half-tone block. When the process is correctly carried out substantially correct tone-reproduction is obtained due mainly to the fortunate coincidence that the reduction in dot size which occurs during the etching of a half-tone block and in the ink-squash which occurs during printing together just about balance the errors inherent in the screen negative.

In the production of screen negatives for colour reproduction, however, a more elaborate procedure is employed and usually this involves colour masking if extensive retouching is to be avoided. Thus the general method involves producing first a set of continuous tone separation negatives, then producing appropriate colour-correction masks, then corrected continuous tone positives, and from these last are made the final screen negatives. The screen positives made by the use of the photographic elements of this invention may be used with advantage by producing screen negatives therefrom by contact-printing and preparing from these negatives half-tone blocks which automatically contain the tone and colour corrections inherent in the original screen positives.

The gelatino silver halide photographic emulsion layers of the elements of this invention may employ, as silver halide, silver bromide or silver chloride or mixtures of either or both with silver iodide, e. g. silver chlorobromide or silver iodobromide.

The gelatin of the inner emulsion layer may be hardened by any of the well-known gelatin hardening agents of which examples are chrome alum, aldehydes such as formaldehyde, dialdehydes such as glyoxal and mesoxaldialdehyde, derivatives thereof such as glyoxal sodium bisulphite and glyoxal tetra-acetate, hydroxyaldehydes such as glyceric hydehyde and tartaric dialdehyde, ketones such as diacetyl, acetyl-caproyl and acetyl-benzoyl, acetonyl acetone, terephthalic aldehyde, hexamethylene tetramine, mucochloric acid and mucobromic acid.

Large numbers of dyes which are discharged by ordinary photographic developers or may be readily discharged by subsequent treatment are known and any may be selected for the particular process with which the photographic element is to be used. Examples (with Colour Index Numbers in brackets) are—

Auramine (655)
Helianthin (142, 146)
Acid blue black (246)
Rhodamine (749, 750, 751, 753)
Crocein Scarlet (277, 251, 252, 286)
Spirit soluble nigrosine (864)
Poncean 2R (79)
Acid Magenta (692)
Tartrazine (640)
Xylene Red
Disulphine Blue Where a black filter layer is required it may be achieved by an appropriate mixture of dyes, e. g. blue, green and red.

The photographic element may be carried on any transparent support, e. g. glass or film base such as cellulose acetate, cellulose triacetate, cellulose acetobutyrate or cellulose acetoproprionate base, or film base made of other colloid materials such as an ethylene glycol-terephthalic ester polymer, a vinyl or acrylic polymer or a linear superpolyamide.

The photographic elements are prepared by coating onto the glass or film base a layer of photographic gelatino silver halide emulsion containing (if desired) a sensitising dye, e. g. a cyanine, carbocyanine or polycarbocyanine or merocyanine dye, and a hardening agent, allowing the emulsion to set, supercoating (if desired) with a gelatin filter layer containing one or more filter dyes, allowing this coating to set, coating with an unhardened photographic gelatino silver halide emulsion and optionally with a non-stress supercoat, and allowing the coated product to dry.

The following examples will serve to illustrate the invention but are not to be regarded as limiting it in any way:

EXAMPLE I

Reproduction of a Continuous-Tone Monochrome Photograph

The material used for this reproduction is illustrated in Figure 1 of the accompanying drawings and consisted of a glass support 1 coated with a normal thickness of high contrast blue-sensitive emulsion 2 which was hardened to a high degree. On top of the emulsion layer 2 was a normal thickness of high contrast panchromatic emulsion 3 which was unhardened.

The original photograph was set up on the process camera fitted with a lens of 18″ focal length and illuminated by four 30 amp. open arc lamps at 3′ 6″ from the centre of the copyboard. A half-tone screen with 133 rulings per inch was arranged at a screen distance of 3 mm. The steps in the process were as follows:

(1) The double-coated plate of Figure 1 was placed in the camera behind the screen and the exposure was effected through a tricolour red filter (Wratten 29). The exposure was made up of 40 seconds to the original subject at a lens aperture of $v/32$ and 10 seconds to a uniform white surface at a lens aperture of $v/64$ and with a neutral density of 1.0 in addition to the red filter.

(2) The plate was developed for 2 minutes at 65° F. in a developer of the following composition.

| | | |
|---|---|---|
| Metol | g | 1.25 |
| Sodium sulphite (anhydrous) | g | 20 |
| Hydroquinone | g | 5.25 |
| Sodium carbonate (anhydrous) | g | 27.5 |
| Potassium bromide 10% soln | cc | 3.5 |
| Benzotriazol 1% soln | cc | 7.5 |
| Water to 2 litres. | | |

(3) The plate was washed for 10 minutes in running water.

(4) The plate was bathed for 5 minutes in industrial spirit. (This step is optional and may be omitted).

(5) The plate was dried and replaced in the camera in the position it occupied for the first exposure. The screen was removed and replaced by a sheet of plain glass of similar thickness. A black paper marginal mask was arranged on the glass, to prevent light from striking the edges of the plate, while not obscuring the work area.

(6) The plate was re-exposed to the original without a filter for 60 seconds at $v/24$. The original was then covered with white paper and a further exposure of 60 seconds at $v/48$ was given without a filter.

(7) The plate was developed for 3 minutes at 65° F. in a developer made up by mixing equal parts of the following solutions:

*Solution A*

| | | |
|---|---|---|
| Hydroquinone | g | 25 |
| Potassium metabisulphite | g | 25 |
| Potassium bromide | g | 25 |
| Water to 1 litre. | | |

*Solution B*

| | | |
|---|---|---|
| Potassium hydroxide | g | 50 |
| Water to 1 litre. | | |

(8) The plate was fixed in a non-hardening acid fixing bath.

(9) The plate was rocked in a dish of water at 120° F. until most of the completely blackened top layer was removed. The warm water was then replaced by a fresh lot and the surface of the plate was lightly swabbed with cotton wool while completely immersed in the warm water.

(10) The plate was chilled in cold water and dried.

The resulting screen positive was printed down on to metal and gave an excellent reproduction of the original photograph. The density range and gradation of proofs taken from the plate approximated very closely to that of the original.

EXAMPLE II

Reproduction of a Coloured Original

Figure 2:
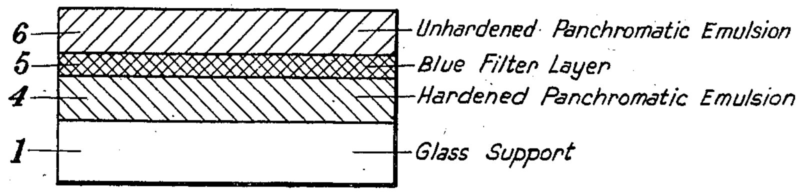
Figure 3:
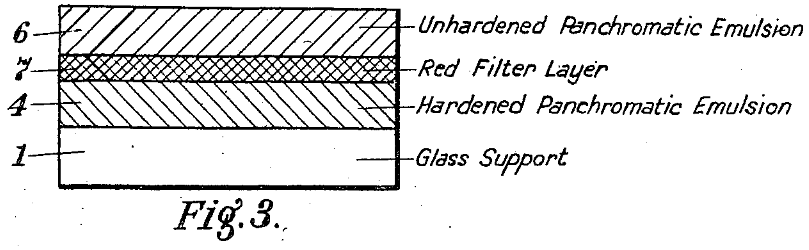

The materials used for this reproduction are shown in Figures 2 and 3 of the accompanying drawings. The material of Figure 2 consists of a glass support 1 coated with a normal thickness of high contrast panchromatic emulsion 4 which was hardened to a high degree. On top of layer 4 was coated a layer 5 of gelatin containing a dischargeable blue filter dye, and on top of this again, a second layer 6 of high contrast panchromatic emulsion of normal thickness. Layers 5 and 6 were unhardened. The material of Figure 3 is similar to that of Figure 2 except that a red filter layer 7 is provided instead of the blue filter layer 5.

The original was set up on the process camera fitted with a lens of 18″ focal length and illuminated by four 30 amp. open arc lamps at 3′6″ from the centre of the copyboard. A half-tone screen with 133 rulings per inch was arranged at a screen distance of 3 mm.

The "blue-printer" screen positive was made as follows:

(1) A plate of the structure of Figure 2 was placed in the camera behind the screen and the exposure was effected through a tricolour red filter (Wratten 29). The exposure was made up of 40 seconds to the original subject at a lens aperture of $v/32$ and 10 seconds to a uniform white surface at a lens aperture of $v/64$ and with a neutral density of 1.0 in addition to the red filter.

(2) The plate was developed for 2 minutes at 65° F. in a developer made to the formula given in Example I, step 2.

(3) The plate was washed for 10 minutes in running water.

(4) The plate was bathed for 5 minutes in industrial spirit.

(5) The plate was dried and replaced in the camera in the position it occupied for the first exposure. The screen was removed and replaced by a sheet of plain glass of similar thickness. A black paper marginal mask was arranged on the glass to prevent light from striking the edges of the plate, while not obscuring the work area.

(6) The plate was re-exposed to the original through a tricolour red filter (Wratten 29) for 240 seconds at a lens aperture of $v/24$. The original was then covered with white paper and a further exposure of 60 seconds was given.

Thereafter the plate was treated exactly as in Example 1, steps 7 to 10.

The "red-printer" screen positive was made as follows:

(1) A plate of the structure of Figure 2 was placed in the camera behind the screen and the exposure was effected through a tricolour green filter (Wratten 61). The exposure was made up of 49 seconds to the original subject at a lens aperture of $v/32$ and 12 seconds to a uniform white surface at a lens aperture of $v/64$ and with a neutral density of 1.0 in addition to the green filter.

(2) Thereafter the plate was treated exactly as described for the "blue-printer" positive.

The "yellow-printer" screen positive was made as follows:

(1) A plate of the structure of Figure 3 was placed in the camera behind the screen and the exposure was effected through a tri-colour blue filter (Wratten 49). The exposure was made up of 37 seconds to the original subject at a lens aperture of $v/32$ and 9 seconds to a uniform white surface at a lens aperture of $v/64$ and with a neutral density of 1.0 in addition to the blue filter.

Steps 2–5 were exactly as for the "blue-printer" positive.

(6) The plate was re-exposed to the original through a tri-colour green filter (Wratten 61) for 295 seconds at a lens aperture of $v/24$. The original was then covered with white paper and a further exposure of 74 seconds was given.

Thereafter the plate was treated exactly as in Example I, steps 7 to 10.

Litho plates were made from the three screen positives thus obtained and printed in superposition respectively in "blue" (cyan), "red" (magenta) and yellow inks. Preferably a "black printer" record was additionally printed in superposition. There was thus obtained a reproduction of the original subject of excellent colour balance and tonal gradation.

I claim:

A photographic element comprising a transparent support carrying two superimposed photographic gelatino silver halide emulsion layers of which the outer emulsion layer is unhardened and the inner emulsion layer is hardened, both layers being panchromatic and the said layers being separated by a thin filter layer containing a dischargeable dye selected from the class consisting of blue dyes and red dyes.

References Cited in the file of this patent

UNITED STATES PATENTS

| | | |
|---|---|---|
| 1,285,015 | Browning | Nov. 19, 1918 |
| 1,303,635 | Capstaff | May 13, 1919 |
| 2,159,600 | Murray et al. | May 23, 1939 |
| 2,165,407 | Murray | July 11, 1939 |
| 2,231,684 | Schinzel | Feb. 11, 1941 |
| 2,241,519 | Pollak | May 13, 1941 |

FOREIGN PATENTS

| | | |
|---|---|---|
| 333,931 | Great Britain | Aug. 25, 1930 |